US010278401B2

(12) United States Patent
Van Der Leest et al.

(10) Patent No.: US 10,278,401 B2
(45) Date of Patent: May 7, 2019

(54) SYSTEM FOR AUTOMATICALLY LOOSENING OR REMOVING SHOULDER BLADES FROM SHOULDERS OF CARCASSES

(71) Applicant: MAREL MEAT B.V., Boxmeer (NL)

(72) Inventors: Johannes Cornelius Antonius Maria Van Der Leest, Oss (NL); Dennis Antoon Johan Stoots, Oss (NL); Franciscus Theodorus Henricus Johannes Van Der Steen, Megen (NL)

(73) Assignee: MAREL MEAT B.V., Boxmeer (NL)

( * ) Notice: Subject to any disclaimer, the term of this patent is extended or adjusted under 35 U.S.C. 154(b) by 0 days.

(21) Appl. No.: 15/748,789

(22) PCT Filed: Jul. 13, 2016

(86) PCT No.: PCT/EP2016/066646
§ 371 (c)(1),
(2) Date: Jan. 30, 2018

(87) PCT Pub. No.: WO2017/016874
PCT Pub. Date: Feb. 2, 2017

(65) Prior Publication Data
US 2019/0008170 A1    Jan. 10, 2019

(30) Foreign Application Priority Data

Jul. 30, 2015    (EP) .................................... 15179087

(51) Int. Cl.
*A22B 5/00*    (2006.01)
(52) U.S. Cl.
CPC .......... *A22B 5/0035* (2013.01); *A22B 5/0029* (2013.01)

(58) Field of Classification Search
CPC ......... A22B 5/00; A22B 5/007; A22B 5/0017; A22B 5/0035; A22B 7/002
(Continued)

(56) References Cited

U.S. PATENT DOCUMENTS 4,894,885 A * 1/1990 Markert ................. A22B 3/086
452/53
4,985,963 A    1/1991 Norling
(Continued)

FOREIGN PATENT DOCUMENTS

EP    0590733 A1    4/1994
GB    1488051 A    10/1977
(Continued)

OTHER PUBLICATIONS

European Search Report from EP Application No. EP 15179087, dated Feb. 9, 2016.
(Continued)

*Primary Examiner* — Richard T Price, Jr.
(74) *Attorney, Agent, or Firm* — Workman Nydegger

(57) ABSTRACT

A system and a method for automatically loosening or removing shoulder blades from shoulders of animal carcasses includes a holding means operably connected to transport means, and is provided for securing a shoulder selected from the shoulders at the leg portion and transporting the shoulder in a transport direction. A separator means is provided including an elongated separation section arranged to abut the shoulder blade as the shoulder blade is transported past the elongated separation section. The elongated separation section is positioned at an angle relative to the transport direction of the shoulder such that an increasing pulling force is obtained onto the shoulder blade until the shoulder blade is either loosened or separated from the shoulder.

15 Claims, 7 Drawing Sheets

(58) Field of Classification Search
USPC ....... 452/135, 136, 137, 138, 125, 126, 149, 452/153
See application file for complete search history.

(56) References Cited

U.S. PATENT DOCUMENTS

| | | | | |
|---|---|---|---|---|
| 5,279,518 | A * | 1/1994 | Ekiss | A22B 5/161 |
| | | | | 452/125 |
| 2003/0008608 | A1* | 1/2003 | Scalia | A22B 5/0035 |
| | | | | 452/157 |
| 2006/0030250 | A1* | 2/2006 | Hino | A22B 5/0035 |
| | | | | 452/135 |
| 2009/0270021 | A1* | 10/2009 | Umino | A22C 17/004 |
| | | | | 452/136 |
| 2012/0315834 | A1 | 12/2012 | Van Der Steen et al. | |
| 2014/0315476 | A1* | 10/2014 | Connell | A22C 21/0069 |
| | | | | 452/125 |
| 2014/0378040 | A1 | 12/2014 | Taniguchi et al. | |
| 2014/0378041 | A1* | 12/2014 | Taniguchi | A22C 17/004 |
| | | | | 452/135 |

FOREIGN PATENT DOCUMENTS

| | | | |
|---|---|---|---|
| WO | 2005053412 | A1 | 6/2005 |
| WO | 2011074969 | A2 | 6/2011 |

OTHER PUBLICATIONS

International Search Report and Written Opinion from PCT Application No. PCT/EP2016/066646, dated Oct. 17, 2016.

* cited by examiner

SYSTEM FOR AUTOMATICALLY LOOSENING OR REMOVING SHOULDER BLADES FROM SHOULDERS OF CARCASSES

FIELD OF THE INVENTION

The present invention relates to a system and a method for automatically loosening or removing shoulder blades from shoulders of carcasses.

BACKGROUND OF THE INVENTION

The slaughtering of red meat slaughter animals and the subsequent cutting up of the carcasses takes place in slaughterhouses and/or meat processing plants. Even in relatively modern slaughterhouses and red meat processing plants, many of the processes are carried out partly or entirely by hand. This is at least partly due to the variation in shapes, sizes and weights of the carcasses and carcass parts to be processed and to the harsh environmental conditions that are present in the processing areas of slaughterhouses and red meat processing plants. This manual or semi-automated processing results in harsh laboring conditions for the workers and high labor costs.

The above mentioned problem has partly been solved may US2012/0315834 disclosing a system and method for processing slaughtered animals and/or parts thereof, in particularly slaughtered pigs where e.g. an overhang transport system is used for conveying individual pig leg parts while various processing steps are being performed. One of these processing steps is illustrated in FIG. 1 showing a manually removal of a shoulder blade from a pig carcass carried by a carrier 108 that is attached to an overhang transport system (not shown) that moves the carrier and thus the carcass part in a conveying direction T. An operator 110 uses a shoulder blade detachment tool 102. A carrier brings the carcass part 105 to be processed to the shoulder blade detachment processing station, where support guides 109 make sure that the carcass part is presented to the operator 110 in an appropriate orientation.

At the start of the processing process the operator arranges the pulling plate 104 behind the shoulder blade whereby pulling a trigger of the tool the pulling plate 104 moves towards the operator and pulls the shoulder blade at least partly loose from the carcass part while the carcass part is held in a fixed position.

It should be noted that the shoulder blade detachment tool 102 shown here may just as well be implemented while the carcass is resting on a table (not shown).

The manual or semi manual process is however physically difficult for the operator and also results in a high labour costs.

There is thus a need for an apparatus that is capable of automatically removing the shoulder blade from the carcass in a simple way.

SUMMARY OF THE INVENTION

On the above background it is an object of embodiments of the present invention to provide a system capable of automatically loosening or removing a shoulder blade from shoulder of carcasses such as, but not limited to, pig carcasses, with high yield.

In general, the invention preferably seeks to mitigate, alleviate or eliminate one or more of the above mentioned disadvantages of the prior art singly or in any combination.

In particular, it may be seen as an object of embodiments of the present invention to provide a system that solves the above mentioned problems, or other problems.

To better address one or more of these concerns, in a first aspect of the invention a system is provided for automatically loosening or removing shoulder blades from shoulders of animal carcass, the system comprising:

a holding means, operably connected to a transport means, for securing a shoulder selected from the shoulders at the leg portion and transporting the shoulder in a transport direction, and a separator means comprising:

an elongated separation section arranged to abut the shoulder blade as the shoulder blade is transported past the elongated separation section, the elongated separation section being positioned at an angle relative to the transport direction of the shoulder such that an increasing pulling force is obtained onto the shoulder blade until the shoulder blade is either loosened or separated from the shoulder, wherein the transport means comprises an overhead conveyor and the holding means comprises a shackle slideably attached to the overhead conveyor and configured to carry the shoulder at the leg portion of the shoulder, the system further comprising a conveyor means arranged below the overhead conveyor configured to receive the shoulder, where the shoulder is conveyed by the conveyor means in substantially the same direction.

Accordingly, a system is provided that is capable of loosen or removing the shoulder blade from the shoulder of the carcass, fully automatically. In case of loosening the shoulder blade from the shoulder the shoulder blade may subsequently be removed manually or with any kind of a tool either fully automatically or semi automatically. The pulling force may also be increased until the shoulder blade is fully separated from the shoulder.

Moreover, pulling the shoulder blade from the shoulder, instead of e.g. cutting it away from the shoulder, increases the yield of the processing significantly.

The transport direction may according to the present invention be a linear or a curved direction or any type of a pre-determined transport path where e.g. the holding means and the transport means may comprise any type of a robotic arm or similar means that is configured to move the shoulder along the pre-determined path or along the linear/transport direction.

By the term angle between elongated separation section and the transport direction may be understood as any angle, e.g. any angle x where 0<x<180°. Moreover, the angle may be variable in the downstream direction, i.e. x does not necessarily have to be fixed, e.g. may have a kind of a curved form.

The increasing pulling force may in one embodiment be obtained by positioning the elongated separation section such that the distance between the holding means and the elongated separation section increases as the shoulder is transported in the transport direction.

In one embodiment, the shoulder is conveyed by the conveyor means with substantially the same speed as the overhead conveyor.

Also, a system is provided that may be used in relation with existing overhead conveyor based food processing systems as an additional processing module for automatically removing the shoulder blade from the shoulder.

More importantly, the system makes the handling of the shoulder portions easier because of greatly reduced strain on operators since only minimal lifting and removing of the shoulder portions is needed.

The conveyor means may be understood as any means capable of advancing the shoulder comprising a support and a driving means, where the shoulder may be resting on the support and where the driving means may comprise motor driven pins/plates etc. for advancing the shoulder on the support. The step of receiving the shoulder is preferably done such that the shoulder is partly resting on the conveyor means.

The conveyor means may also comprise a conveyor comprising and endless belt or chain.

In one embodiment, the separator means further comprises an engaging section arranged upstream in relation to the elongated separation section configured to engage between the shoulder blade and the humerus bone of the shoulder while the shoulder is transported past the engaging section. This may facilitate the elongated separation section to engage with the shoulder blade, i.e. to get the appropriate grip on the shoulder blade needed to loosen it or separate it completely from the shoulder.

The engaging section may in one embodiment comprise a beam or a rod having a free end pointing in upstream direction where the free end is configured to engage between the shoulder blade and the shoulder, where it may be (but not necessarily) assumed that a pre-cut has been performed there between. In another embodiment, the engaging section may comprise a cutting means for performing said pre-cut between the shoulder blade and the shoulder while simultaneously engaging there between. As an example, said free end may be provided with a cutting tool for performing a pre-cut between the shoulder blade and the shoulder.

In one embodiment, the system further comprises a guide means configured to engage with a lower part of the shoulder for supplying a pressure onto the lower part of the shoulder while the shoulder is transported by the transporting means so as to compress the shoulder blade from the shoulder, e.g. to create a gap between the shoulder blade(s) and the humerus bone(s) of the shoulder. The guide means may in one embodiment comprise an elongated and fixed beam or rod arranged at least partly along the transport direction.

This facilitates the elongated separation section to engage with the shoulder blade, and/or facilitates the engaging section to enter the gap between the shoulder blade and the humerus bone of the shoulder. The guide means may comprise any mechanical tool or the guide means may also be understood as manual pressure provided with an operator e.g. by pushing onto the lower part of the shoulder.

In one embodiment, the system further comprises a pre-cut means arranged upstream in relation to the elongated separation section for performing a pre-cut between the shoulder and the shoulder blade prior to loosening or removing the shoulder blade from the shoulder. The pre-cut means may be an operator performing a manual pre-cut, or any type of semi or fully automatic operation by any type of a cutting tool of e.g. blade type that makes an appropriate opening between the shoulder blade and the shoulder. As an example, the pre-cut may have been done before the guide means engages with the lower part of the shoulder.

In one embodiment, the conveyor means is positioned such that a rotation axis of the conveyor means forms an angle compared to an vertical axis such that an upper transport side of the conveyor means is facing the separator means.

In one embodiment, the angle of the conveyor means and thus of the shoulder may between 0-90 degree angle, e.g. around 45 degree angle.

In one embodiment, the conveyor means comprises an endless transport chain.

In one embodiment, the conveyor means further comprises a plurality of spaced apart support structures arranged on the transport chain configured to provide a support to the shoulder during the loosing or separation of the shoulder blade from shoulder.

The support structures may in one embodiment comprise a kind of a backstop structures configured to be positioned at an upstream side of the shoulder for providing a back support to the shoulder so as to prevent the shoulder to slide in an upstream direction during the shoulder blade loosening or removal.

In one embodiment, the conveyor means is operated by a control unit such that, upon receiving the shoulder, a support structure is positioned at a desired position for providing the support to the shoulder during the loosening or removal of the shoulder blade from shoulder. Thus, a simple solution is provided for ensuring that the shoulder does not slide backwards opposite to the transport direction while pulling the shoulder blade away from the shoulder.

The plurality of spaced apart support structures may include guide pins configured to contact the shoulders at a surface of the shoulder which is opposite the transport direction (i.e. it pushes the shoulder along the conveyor belt).

In one embodiment, the elongated separation section comprises a catch guide and a rotatable driven auger, where the distance between the catch guide and the rotatable driven auger is such that the shoulder blade becomes locked there between while being moved by the transport means and the rotational movement of the auger. The catch guide may in one embodiment comprise any type of elongated beam or rod and the like.

In one embodiment, the internal arrangement between the catch guide and the rotatable driven auger is such that the catch guide makes a turning movement over the auger in the downstream moving direction for tilting the shoulder blade and thus generate a pulling force needed for separating it from the shoulder.

The internal arrangement between the rotatable driven auger and the catch guide may in one embodiment be selected such that the distance from an outer surface of the core of the auger and the catch guide is between 12 to 22 mm, such as between 15 to 19 mm, such as around 17 mm. Moreover, the rotatable driven auger may be designed such that the height from a top of the pitch extending upwards from the outer surface of the core of the auger is between 4 to 8 mm, such as between 5 to 7 mm, such as around 6 mm. This should however not be construed as being limited to the above mentioned values.

The distance between the top of the pitch and the catch guide is typically important at the infeed where the auger engages with the shoulder because if this dimension is very small (means high flight on the auger) the blade bone can get stuck at the infeed side because it is difficult to tell where the start of the flight is when the blade bone is just in front of the auger.

In one embodiment, the system further comprises a counter pressure guide means configured to supply a counter force onto the humerus bone of the shoulder opposite to the pulling force exerted by the elongated separation section while transporting the shoulder past the elongated separation section. Accordingly, the pressure load that might otherwise be present on the holding means, e.g. the shackle, is eliminated and instead transferred to e.g. conveyor means arranged below the overhead conveyor. Accordingly, it is prevented that the shoulder falls out of the holding means during the removal of the shoulder blade.

In one embodiment, the counter pressure guide means is operable connected to at least one actuator means configured to supply a pressure up to a pre-defined threshold limit and where the at least one actuator means is configured to concede if the pressure exceeds the pre-defined threshold limit. Accordingly, due to different thicknesses of the shoulders it is prevented that the humerus bone breaks since the at least one actuator will simply concede when the pressure is too high (e.g. this may be thicker shoulder than the previous one).

This also helps to run bigger range of shoulders having different lengths. As an example, a short shoulder causes more tension on the shackles than a long shoulder. Accordingly, it is possible to process bigger length range of shoulder and thus increase the operational window, i.e. the different sizes of shoulders.

An example of such actuator means is e.g. air cylinder, jack and the like.

In a second aspect of the invention a method is provided for automatically loosening or removing shoulder blades from shoulders of animal carcass, the method comprising:

securing a shoulder at the leg portion by a holding means operable connected to a transport means and moving the shoulder by the holding means in a transport direction, and removing the shoulder blade from the shoulder by a separator means comprising an elongated separation section by means of supplying a pulling force onto the shoulder blade by the elongated separation section as the shoulder blade is transported past the elongated separation section, the elongated separation section being positioned at an angle relative to the transport direction of the shoulder such that the distance between the holding means and the elongated separation section increases as the shoulder is transported in the transport direction past the elongated separation section causing an increasing pulling force onto the shoulder blade until the shoulder blade is either loosened or separated from the shoulder, wherein the transport means comprises an overhead conveyor and the holding means comprises a shackle slideable attached to the overhead conveyor and configured to carry the shoulder at the leg portion of the shoulder, the method further comprising:

receiving the shoulder by a conveyor means, and conveying the shoulder by the conveyor means in substantially the same direction as the overhead conveyor.

In one embodiment, the step of receiving the should by the conveyor means is such that such that the shoulder is partly resting on the conveyor means.

In one embodiment, the method further comprises, prior to removing the shoulder blade from the shoulder by the separator means, supplying a pressure by a guide means onto the lower part of the shoulder while the shoulder is transported by the transporting means so as to compress the shoulder blade from the shoulder. This facilitates the separator means to engage with or grip the shoulder blade.

In one embodiment, the method further comprises performing a pre-cut between the shoulder blade and the shoulder prior to removing the shoulder blade from the shoulder by a separator means. It is thus possible, via e.g. pressing by the guide means to expose the space to between the shoulder blade and the shoulder and thus further facilitate the separator means to engage or grip the shoulder blade.

In one embodiment, the method further comprises engaging by an engaging section the gap between the shoulder blade and the humerus bone of the shoulder while the shoulder is transported past the engaging section. Thus, a guide is provided for guiding the separator means to the area between the shoulder blade and the shoulder.

In one embodiment, the method further comprises advancing the shoulder with substantially the same speed as the overhead conveyor.

Accordingly, a method is provided capable of fully automatically and with high yield removing shoulder blades from shoulders of any type of animal carcasses, e.g. pork, sheep, goat, beef, etc., carcasses.

BRIEF DESCRIPTION OF THE DRAWINGS

Embodiments of the invention will be described, by way of example only, with reference to the drawings, in which.

DESCRIPTION OF EMBODIMENTS

Figure 2:
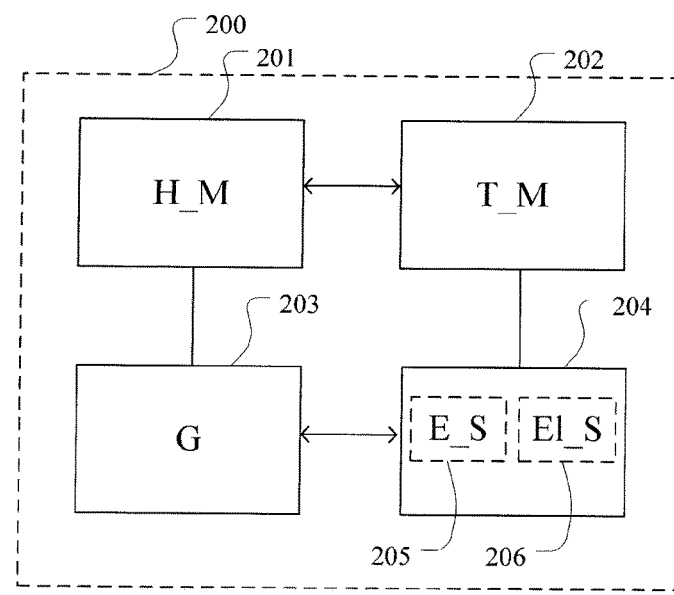
FIG. 2 shows a block diagram of a system according to the present invention.

FIG. 2 shows a block diagram of a system 200 according to the present invention for automatically loosening or removing shoulder blades from shoulders of an animal carcasses, such as pork, where the system comprises a holding means (H_M) 201 operable connected to a transport means (T_M) 202, and a separator means 204 comprising an elongated separation section (El_S) 206.

In this embodiment, the system 200 further comprises a guide means (G) 203, and the separator means 204 further comprises comprising an engaging section (E_S) 205. It should be noted that the present invention may be implemented in the absence of the guide means (G) 203 and the engaging section (E_S) 205. However, for animal carcasses such as porks it may be beneficial to implement these additional features and thus, for simplicity, the embodiments discussed here below will contain additionally at least said features.

In the following, it is assumed that the system fully removes the shoulder blade automatically.

The holding means (H_M) 201 and the operable connected transport means (T_M) 202 are configured for securing a shoulder at the leg portion and transporting the shoulder in a transport direction. The holding means and transport means (T_M) 202 may e.g. include a robotic arm that is operated by a robotic system that allows any kind of transport along e.g. a linear or curved transport direction or along a pre-defined path that may e.g. be dynamically determined or be pre-fixed.

As will be discussed in more details later, the holding means may include a shackle and the transport means may comprises an overhead conveyor where the shackle is slideable attached to the overhead conveyor configured to carry the shoulder at the leg portion of the shoulders.

The guide (G) 203 is configured to engage with a lower part of the shoulder for supplying a pressure onto the lower part of the shoulder while the shoulder is transported by the transporting means so as to move the shoulder blade away from the shoulder, e.g. to create a gap between the shoulder blade and the humerus bone of the shoulder if a pre-cut has been formed between the shoulder blade and the shoulder.

The separator means 204 is arranged downstream in a transport direction of the shoulder in relation to the guide, where the engaging section (E_S) 205 is configured to enter the gap created by the guide (G) between the shoulder blade and the humerus bone of the shoulder while the shoulder is transported past the engaging section.

Moreover, the elongated separation section (El_S) 206 is arranged to abut the shoulder blade as the shoulder blade is transported past the elongated separation section. The elongated separation section may be positioned at an angle relative to the transport direction of the shoulder such that the distance between the holding means and the elongated separation section increases as the shoulder is transported in the transport direction past the elongated separation section causing an increasing pulling force onto the shoulder blade until the shoulder blade is either loosened or separated from the shoulder.

Figure 3:
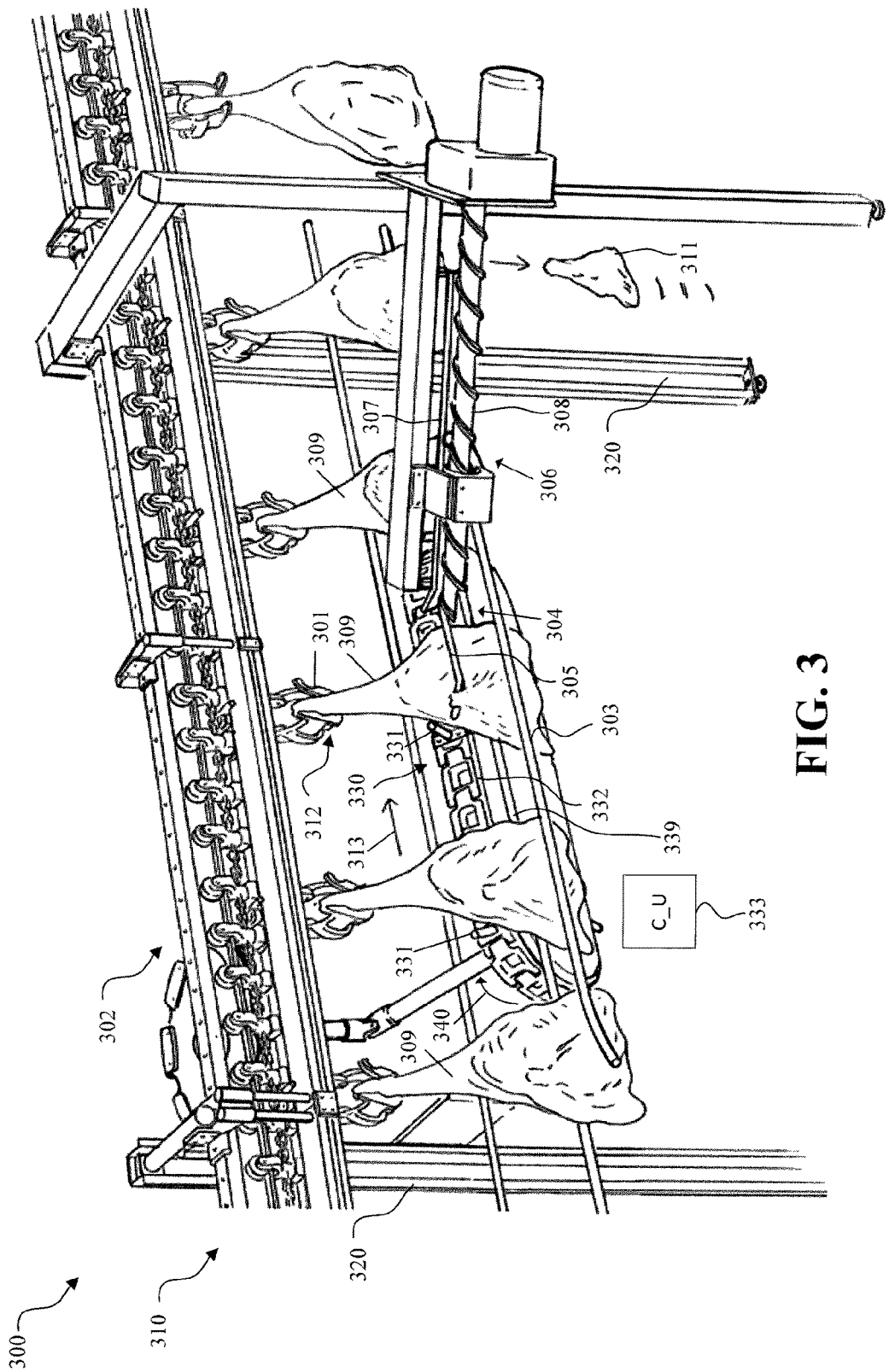
FIG. 3 shows one embodiment of a system according to the present invention for automatically removing shoulder blades from shoulders of animal carcass.

FIG. 3 shows one embodiment of a system 300 according to the present invention comprising a holding means 301 operable connected to a transport means 302, a guide 303 and a separator means 304 comprising an engaging section 305 and an elongated separation section 306.

In this embodiment, the transport means 302 comprises an overhead conveyor 310 mounted to a frame 320 and where the holding means comprises a shackle 301, as shown here plurality of shackles, slideable attached to the overhead conveyor configured to carry the shoulder at the leg portion 312 of the shoulder in a transport direction as indicated by arrow 313.

More details for an example of such a shackles and overhead transport-conveyor system may be found in WO2011/074969, e.g. on p. 59 l. 26-p. 60 l.12 and FIGS. 21, 17 and 20, and p. 65 l. 17-p. 69 l.7 and FIGS. 25-25***, hereby incorporated by reference. See also WO 2011/074966, hereby incorporated in its entirety be reference.

The system 300 shown here may further comprise a conveyor means 330 arranged below the overhead conveyor 310 configured to receive the shoulder 309, e.g. such that the shoulder is partly resting on the conveyor means 330 and may be tilted by e.g. around 45 degrees, compared to when the shoulder is freely hanging (not shown), and where the shoulder is conveyed by the conveyor means 330 in substantially the same direction as indicated by arrow 340 and in one embodiment with substantially the same speed as the overhead conveyor 310. As shown here, the conveyor means 330 comprises an endless transport chain 332 on which the shoulder 309 is partly resting while being conveyed, and a plurality of spaced apart support structures 331, e.g. back pins as shown here, arranged on the transport chain, where the distance between adjacent support structures is at least as long as the width of the shoulders.

The conveyor means 330 may be operated by a control unit (C_U) 333 in e.g. a synchronized way such that, upon receiving the shoulder, the support structures 331 are positioned at an upstream side of the shoulders for providing a support during the removal of the shoulder blades from shoulders, i.e. for preventing the shoulder to slide opposite to arrow 331.

The guide 303 for engaging with a lower part of the shoulder 309 for supplying the pressure onto the lower part of the shoulder while the shoulder is transported by the transporting means comprises an elongated and fixed beam or rod 303 and the like arranged along to the conveyor means 330. As shown here, a second guide 339 may be provided for providing a kind of a counter hold for the guide 303, where as shown here the shoulder 309 is at least partly resting on the second guide 339 while guide 303 supplies the pressure onto the lower part. This arrangement may just as well work in the absence of the second guide 339.

The engaging section 305 may comprise a beam or a rod having an free end pointing in an upstream direction bended partly inwards towards the coveyor means 330 for smoothly entering the gap between the shoulder blade and the humerus bone of the shoulder while the shoulder is transported past the engaging section 305. The engaging section 305 may also comprise any type of cutting means for performing a pre-cut between the shoulder blade and the shoulder.

The elongated separation section 306 shown here comprises a catch guide 307 and a rotatable driven auger 308. At a position where the engaging section 305 enters the gap between the shoulder blade and the humerus bone of the shoulder the rotatable driven auger is positioned side with the engaging section and as shown here distally away from the holding means, where the distance between the catch guide and the rotatable driven auger is such that the shoulder blade becomes locked there between while being moved by the transport means and the rotational movement of the auger, where the thread of the auger is of course designed so that the advancing of the shoulder blade, after being interlocked between the rotatable driven auger and the catch guide, is advanced in the downstream direction under said angle until it is pulled or separated from the shoulder.

The internal arrangement between the catch guide 307 and the rotatable driven auger may be such that the catch guide 307 makes a turning movement over the auger 308 in the downstream moving direction for tilting the shoulder blade and thus generate a pulling force needed for separating it from the shoulder.

Figure 4:
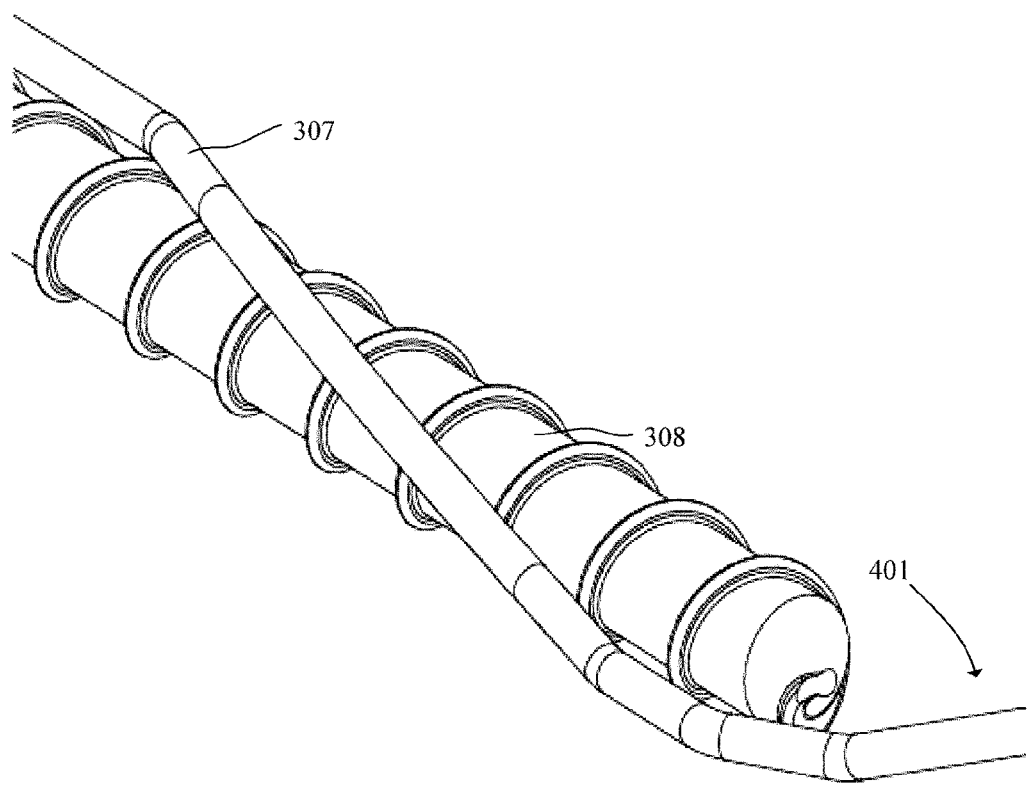
FIGS. 4 and 5 depict one embodiment of an elongated separation section used in separating from the shoulder blade from the shoulder.

This arrangement is depicted graphically in FIG. 4 showing how the catch guide 307 turns over the auger 308 from the infeed end 401 where the shoulder blade (not shown) is received and clamped between the catch guide 307 and the auger 308 and transported in the downstream direction until it is pulled from the shoulder.

Figure 5:
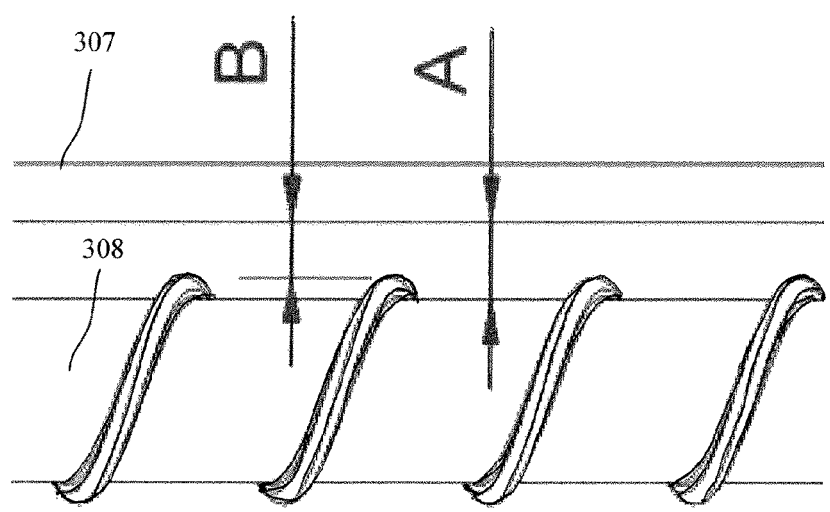

FIG. 5 shows an exemplary embodiment of a dimensional relationship between the auger 308 and the catch guide 307, where dimension A may be of high relevance in preventing the shoulder blade coming loose. As an example, this dimension may be, but is not limited to, around 17 mm.

Figure 1:
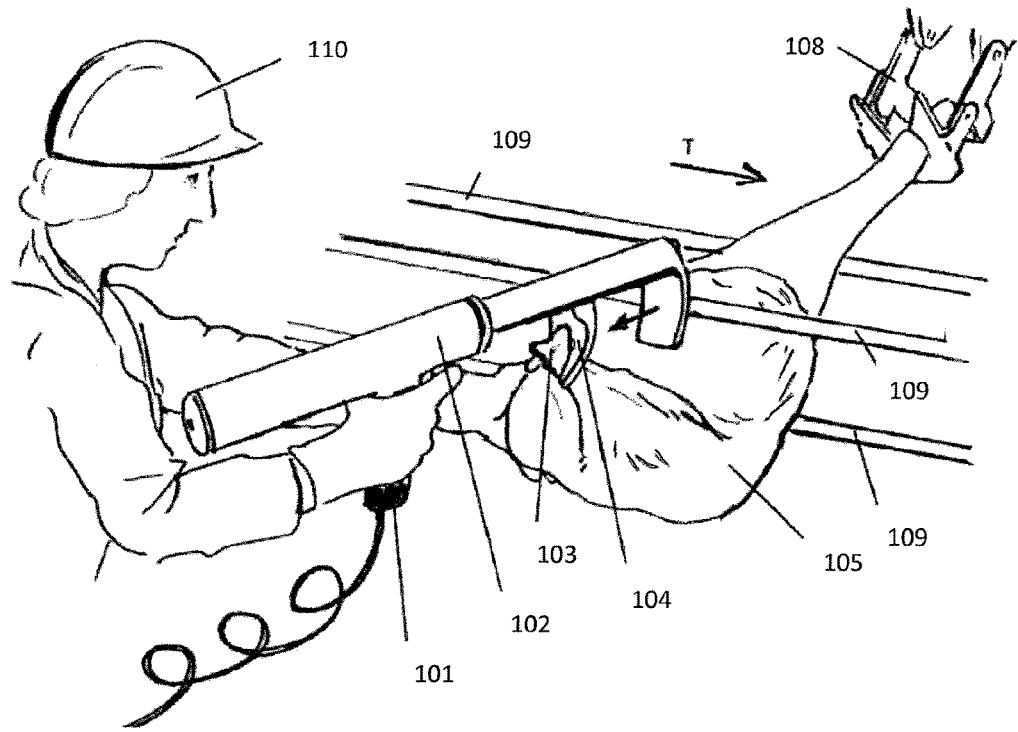
FIG. 1 shows a prior art removal system for loosening or removing a shoulder blade from a shoulder.

The distance between the top of the pitch and the catch guide, i.e. dimension B, may be important at the infeed 401 (see FIG. 1). When this dimension is very small (means high flight on the auger) the blade bone can get stuck at the infeed side because it may be difficult to know where the start of the flight is when the blade bone is just in front of the auger. This may e.g. cause stopping, bend the guidings, or break the shoulder blade, which, in all cases, results in a not-pulled shoulder blade.

As an example, the height of the flight (=A-B) may be, but is not limited to, around 6 mm, in particular if the carcass is pork.

Figure 6:
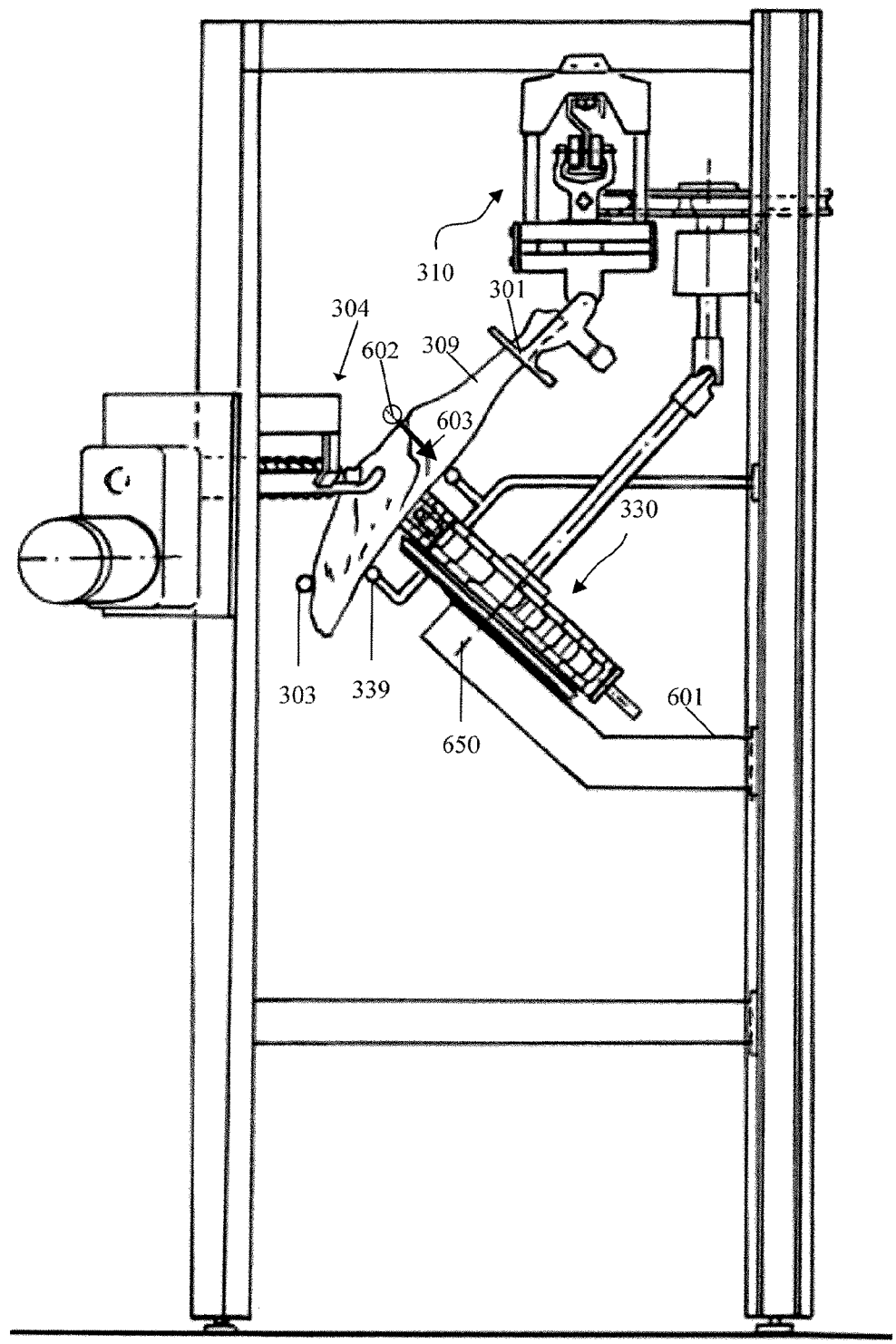
FIG. 6 shows a front view of the embodiment in FIG. 3, FIG. 7a-d depict graphically step by step the separation of the shoulder blade from the shoulder.

FIG. 6 shows a front view of the embodiment in FIG. 3, showing an angled arrangement of the conveyor means 330, where the rotational axis 650 of the conveyor means forms an angle relative to a vertical axis such that upper side of the conveyor means is at least partly pointing towards the elongated separation section, i.e. the catch guide and the auger, while being advanced towards the separator means 304. As depicted here, the shackle 301 is slideable mounted to the overhead conveyor 310 and is provided with a hinge for allowing said angular adjustment of the shoulder during the processing of removing the shoulder blade from the shoulder 309.

This front view also shows said second guide 339 for providing the counter hold for the guide 303.

FIG. 6 further comprises, in addition to the embodiment shown in FIG. 3, a counter pressure guide means 602 configured to supply a counter force indicated by arrow 603 onto the humerus bone of the shoulder opposite to the pulling force exerted by the elongated separation section while transporting the shoulder past the elongated separation section. By doing so, the pressure load that might otherwise be present on the holding means, e.g. the shackle 301 in FIG. 3, is eliminated and instead transferred to e.g. conveyor means arranged below the overhead conveyor. Accordingly, it is prevented that the shoulder falls out of the holding means during the removal of the shoulder blade. The counter pressure guide means may be operable connected to at least one actuator means, e.g. any type of air cylinder, jack and the like, configured to supply a pressure up to a pre-defined threshold limit and where the at least one actuator means is configured to concede if the pressure exceeds the pre-defined threshold limit.

Figure 7A:
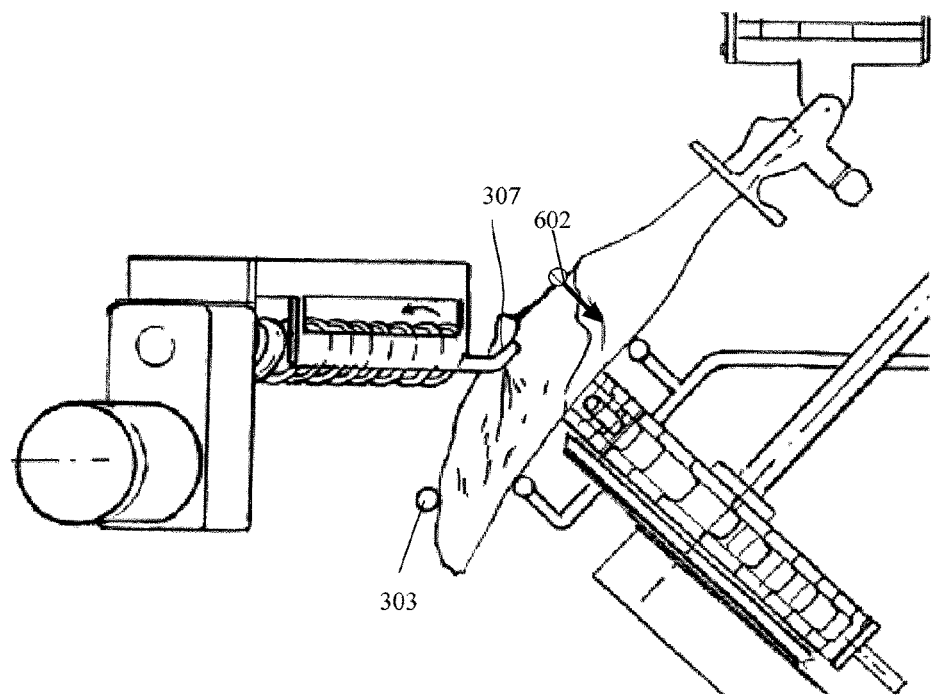
Figure 7B:
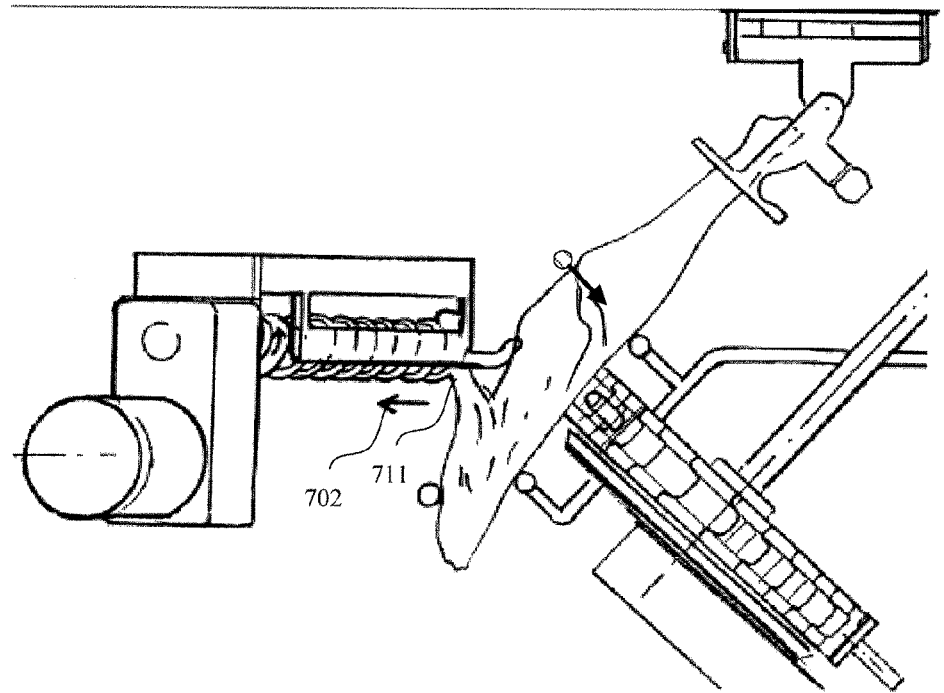
Figure 7C:
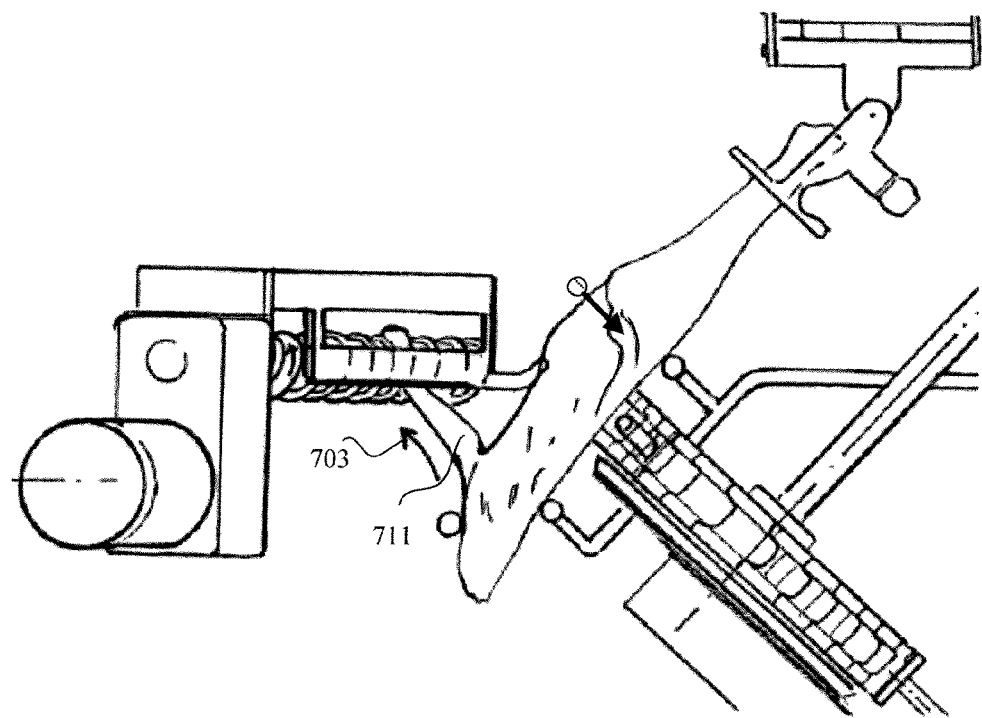
Figure 7D:
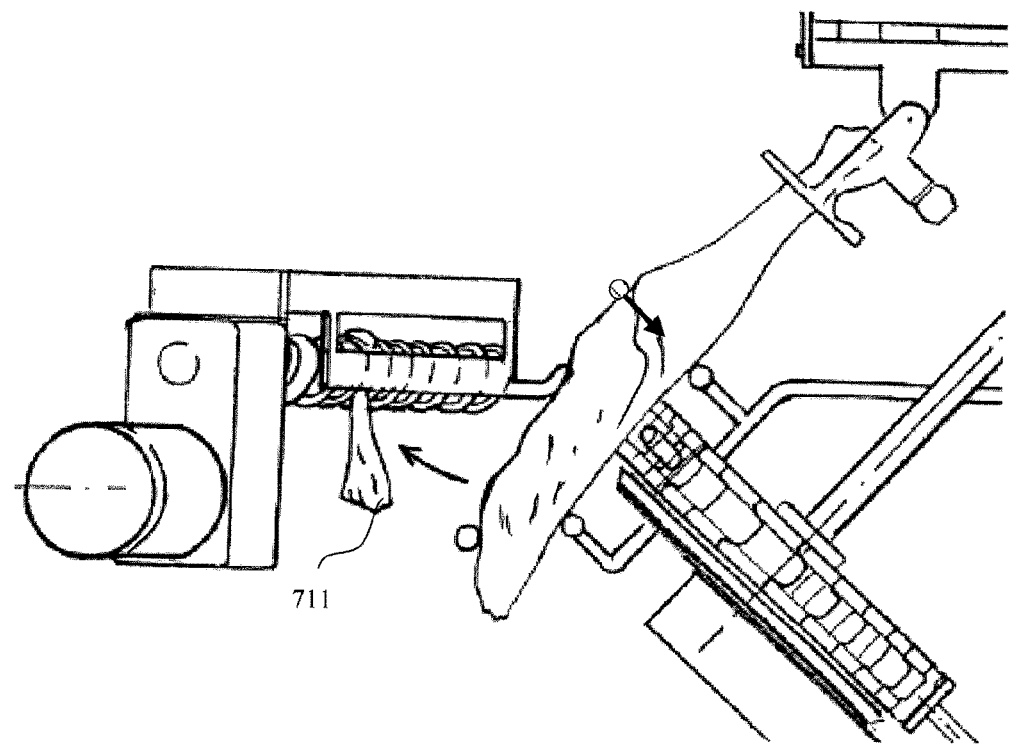

FIG. 7a-d depict graphically step by step the separation of the shoulder blade from the shoulder, starting from where the engaging section 307 enters the gap created by the pressure supplied by the guide means 303, where the pulling force 702 exerted (FIG. 7b) as indicated by arrow shoulder blade 711 increases steadily as the shoulder is transported. FIG. 7c depicts the additional shearing force exerting on the should blade resulting on that the shoulder blade 711 is automatically separated from the shoulder (FIG. 7d). The counter pressure guide means 602 and the counter pressure force is also illustrated.

Figure 8:
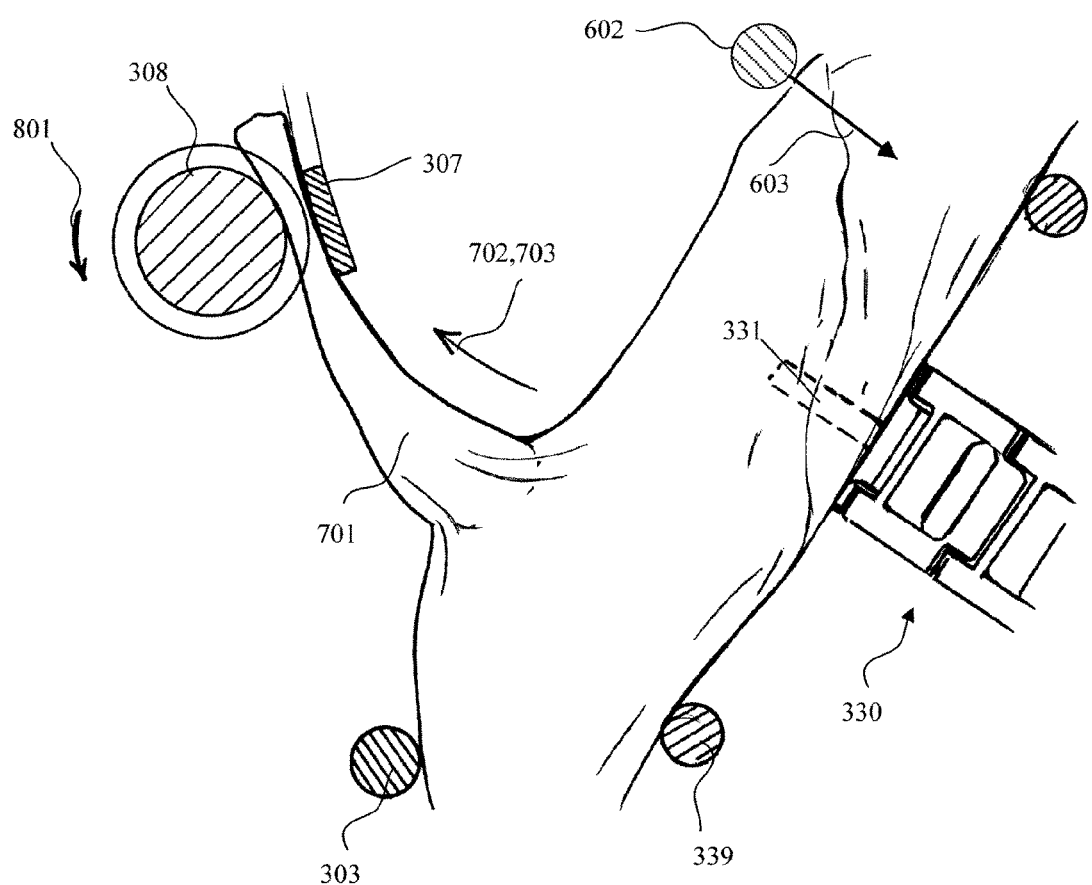
FIG. 8 shows a zoomed up view of FIG. 7c showing in more details the pulling/shearing force exerted on the shoulder blade via the pulling and shearing forces.

FIG. 8 shows a zoomed up view of FIG. 7c showing in more details the pulling/shearing force exerted on the shoulder blade via the pulling and shearing forces 702, 703. The rotational direction of the auger 308 is indicated by arrow 801. Shown is also the interplay between the guide 303, i.e. the elongated and fixed beam or rod, and the second guide 339 that provides a counter force against the supplying pressure by the guide 303. The dotted line indicates the support structure 331.

Furthermore, shown is also the counter pressure guide means 602 for supplying the counter force 603 onto the humerus bone of the shoulder opposite to the pulling force 702, 703 exerted by the elongated separation section while transporting the shoulder past the elongated separation section. As shown here, this also ensures a stable position on the conveyor means 330 and reduces greatly the pressure load that would otherwise be present at the holding means (i.e. the shackles) meaning that the risk that the shoulder falls out of the shackle is greatly reduced or even eliminated.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A system for automatically loosening or removing shoulder blades from shoulders of animal carcass, the system comprising:
    a holding means, operably connected to transport means, for securing a shoulder selected from the shoulders at the leg portion and transporting the shoulder in a transport direction, and
    separator means comprising:
    an elongated separation section arranged to abut the shoulder blade as the shoulder blade is transported past the elongated separation section, the elongated separation section being positioned at an angle relative to the transport direction of the shoulder such that an increasing pulling force is obtained onto the shoulder blade until the shoulder blade is either loosened or separated from the shoulder,
    wherein the transport means comprises an overhead conveyor and the holding means comprises a shackle slideably attached to the overhead conveyor and configured to carry the shoulder at the leg portion of the shoulder, the system further comprising a conveyor means arranged below the overhead conveyor configured to receive the shoulder, where the shoulder is conveyed by the conveyor means in substantially the same direction.

2. The system according to claim 1, wherein the separator means further comprises an engaging section arranged upstream in relation to the elongated separation section configured to engage between the shoulder blade and the humerus bone of the shoulder while the shoulder is transported past the engaging section.

3. The system according to claim 1, further comprising a guide means for supplying a pressure onto the lower part of the shoulder while the shoulder is transported by the transporting means so as to compress the shoulder blade from the shoulder.

4. The system according to claim 1, further comprising a pre-cut means arranged upstream in relation to the elongated separation section for performing a pre-cut between the shoulder and the shoulder blade prior to loosening or removing the shoulder blade from the shoulder.

5. The system according to claim 1, wherein the conveyor means is positioned such that a rotation axis of the conveyor means forms an angle compared to an vertical axis such that an upper transport side of the conveyor means is facing the separator means.

6. The system according to claim 1, wherein the conveyor means further comprises a plurality of spaced apart support structures arranged on the transport chain, where the distance between adjacent support structures is at least as long as the width of the shoulder, the support structures being configured to provide a support to the shoulder during the loosing or separation of the shoulder blade from shoulder.

7. The system according to claim 1, wherein the elongated separation section comprises a catch guide and a rotatable driven auger, where the distance between the catch guide and the rotatable driven auger is such that the shoulder blade becomes locked there between while being moved by the transport means and the rotational movement of the auger.

8. The system according to claim 7, wherein the internal arrangement between the catch guide and the rotatable driven auger is such that the catch guide makes a turning movement over the auger in the downstream moving direction for tilting the shoulder blade and thus generate a pulling force needed for separting it from the shoulder.

9. The system according to claim 1, further comprising a counter pressure guide means configured to supply a counter force onto the humerus bone of the shoulder opposite to the pulling force exerted by the elongated separation section while transporting the shoulder past the elongated separation section.

10. The system according to claim 1, wherein the shoulder is conveyed by the conveyor means with substantially the same speed as the overhead conveyor.

11. A method for automatically loosening or removing shoulder blades from shoulders of animal carcass, the method comprising:
    securing a shoulder at the leg portion by a holding means operable connected to a transport means and moving the shoulder by the holding means in a transport direction, and
    removing the shoulder blade from the shoulder by a separator means comprising an elongated separation section by a means of supplying a pulling force onto the shoulder blade by the elongated separation section as the shoulder blade is transported past the elongated separation section, the elongated separation section being positioned at an angle relative to the transport direction of the shoulder such that the distance between the holding means and the elongated separation section increases as the shoulder is transported in the transport direction past the elongated separation section causing an increasing pulling force onto the shoulder blade until the shoulder blade is either loosened or separated from the shoulder,
    wherein the transport means comprises an overhead conveyor and the holding means comprises a shackle slideably attached to the overhead conveyor and configured to carry the shoulder at the leg portion of the shoulder, the method further comprising:
    receiving the shoulder by a conveyor means arranged below the overhead conveyor, and
    conveying the shoulder by the conveyor means in substantially the same direction as the overhead conveyor.

12. The method according to claim 11, wherein prior to removing the shoulder blade from the shoulder by the separator means, the method further comprises supplying a pressure by a guide means onto the lower part of the shoulder while the shoulder is transported by the transporting means so as to compress the shoulder blade from the shoulder.

13. The method according to claim 11, further comprising performing a pre-cut between the shoulder blade and the shoulder prior to removing the shoulder blade from the shoulder by a separator means.

14. The method according to claim 11, further comprising engaging by an engaging section the gap between the shoulder blade and the humerus bone of the shoulder while the shoulder is transported past the engaging section.

15. The method according to claim 11, further comprising conveying the shoulder by the conveyor means with substantially the same speed as the overhead conveyor.

* * * * *

UNITED STATES PATENT AND TRADEMARK OFFICE
CERTIFICATE OF CORRECTION

PATENT NO. : 10,278,401 B2  
APPLICATION NO. : 15/748789  
DATED : May 7, 2019  
INVENTOR(S) : Johannes Cornelis Antonius Maria Van Der Leest et al.

Page 1 of 1

It is certified that error appears in the above-identified patent and that said Letters Patent is hereby corrected as shown below:

On the Title Page

Item (72), Line 1:
Inventor, change "Johannes Cornelius Antonius Maria VAN DER LEEST" to --Johannes Cornelis Antonius Maria VAN DER LEEST--

Signed and Sealed this
Thirty-first Day of December, 2019

Andrei Iancu
*Director of the United States Patent and Trademark Office*